(12) United States Patent
Hiyoshi et al.

(10) Patent No.: US 6,866,953 B2
(45) Date of Patent: Mar. 15, 2005

(54) FUEL CELL POWER PLANT

(75) Inventors: Takanori Hiyoshi, Yokosuka (JP); Yasukazu Iwasaki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 682 days.

(21) Appl. No.: 09/985,792

(22) Filed: Nov. 6, 2001

(65) Prior Publication Data

US 2002/0068203 A1 Jun. 6, 2002

(30) Foreign Application Priority Data

Dec. 4, 2000 (JP) .................................. 2000-368460

(51) Int. Cl.⁷ .............................................. H01M 8/18
(52) U.S. Cl. ........................ 429/19; 429/20; 429/22; 429/23; 429/24; 429/32; 429/34; 429/38; 429/39
(58) Field of Search ............................ 429/19, 20, 22, 429/23, 24, 32, 34, 38, 39

(56) References Cited

U.S. PATENT DOCUMENTS

| 6,063,515 A | * | 5/2000 | Epp et al. .................... 429/17 |
| 6,210,822 B1 | | 4/2001 | Abersfelder et al. |
| 6,346,340 B1 | | 2/2002 | Abersfelder et al. |
| 6,541,142 B1 | * | 4/2003 | Yu et al. ...................... 429/17 |
| 6,740,432 B1 | * | 5/2004 | Shimanuki et al. .......... 429/13 |

FOREIGN PATENT DOCUMENTS

| EP | 0 751 045 A2 | 1/1997 |
| EP | 0 798 798 A2 | 10/1997 |
| JP | 64-12468 A | 1/1989 |
| JP | 7-226221 | 8/1995 |
| JP | 11-339831 | 12/1999 |

* cited by examiner

*Primary Examiner*—Bruce F. Bell
(74) *Attorney, Agent, or Firm*—Foley & Lardner LLP

(57) ABSTRACT

A reformer (3) supplies a reformate gas to a fuel cell stack (4). The reformer (3) generates a reformate gas by reforming gaseous fuel vaporized by a vaporizer (2). When current supply from the fuel cell stack (4) to the electric motor (21) undergoes a sharp decrease, unnecessary consumption of gaseous fuel is prevented by closing a first valve (11) which supplies gaseous fuel from the vaporizer (2) to the reformer (3) and by opening a second valve (13) which returns gaseous fuel in the vaporizer (2) to the fuel tank (6).

7 Claims, 6 Drawing Sheets

FUEL CELL POWER PLANT

FIELD OF THE INVENTION

This invention relates to a fuel cell power plant provided with a reformer.

BACKGROUND OF THE INVENTION

Tokkai Hei 11-339831 published by the Japanese Patent Office in 1999 discloses a method of generating a reformate gas for a fuel cell stack. That is to say, liquid fuel such as methane or gasoline is evaporated by a vaporizer and the gaseous fuel is processed in a reformer in order to generate a reformate gas having hydrogen as its principal constituent. The vaporizer is provided with a combustor acting as a heat source in order to evaporate the fuel. The combustor supplies heat required for fuel evaporation to the vaporizer by combustion of an anode effluent in the fuel cell stack.

SUMMARY OF THE INVENTION

In a fuel cell power plant using a reformate gas in this manner, fuel is supplied to the vaporizer in response to a power generation amount of the fuel cell stack. When the power generation amount of the fuel cell stack undergoes a sharp decrease or power generation by the fuel cell stack is stopped, fuel already supplied vaporizer is vaporized and still forms a reformate gas in the reformer. However this reformate gas is not consumed by the fuel cell stack and flows into the combustor as an anode effluent. Thereafter it undergoes combustion in the combustor and is discharged to the atmosphere as an exhaust gas. At this point, since fuel supply to the vaporizer is stopped, the vaporizer does not require heat generation by the combustor.

In other words, when the power generation amount of the fuel cell undergoes a sharp decrease or power generation by the fuel cell stack is stopped, the operational efficiency of the fuel cell power plant is adversely affected due to the fact that fuel already supplied to the vaporizer is unnecessarily combusted.

It is therefore an object of this invention to prevent unnecessary consumption of fuel when the power generation amount of the fuel cell stack undergoes a sharp decrease or power generation by the fuel cell stack is stopped.

In order to achieve the above object, this invention provides a fuel cell power plant comprising a fuel tank storing liquid fuel, a vaporizer vaporizing liquid fuel in the fuel tank, a reformer generating a reformate gas containing hydrogen from gaseous fuel supplied from the vaporizer, a fuel cell stack operated by the reformate gas, a first valve cutting off supply of gaseous fuel to the reformer from the vaporizer, a recovery passage returning gaseous fuel in the vaporizer to the fuel tank, and a second valve cutting off the recovery passage.

The details as well as other features and advantages of this invention are set forth in the remainder of the specification and are shown in the accompanying drawings.

DESCRIPTION OF THE PREFERRED EMBODIMENTS

Figure 1:
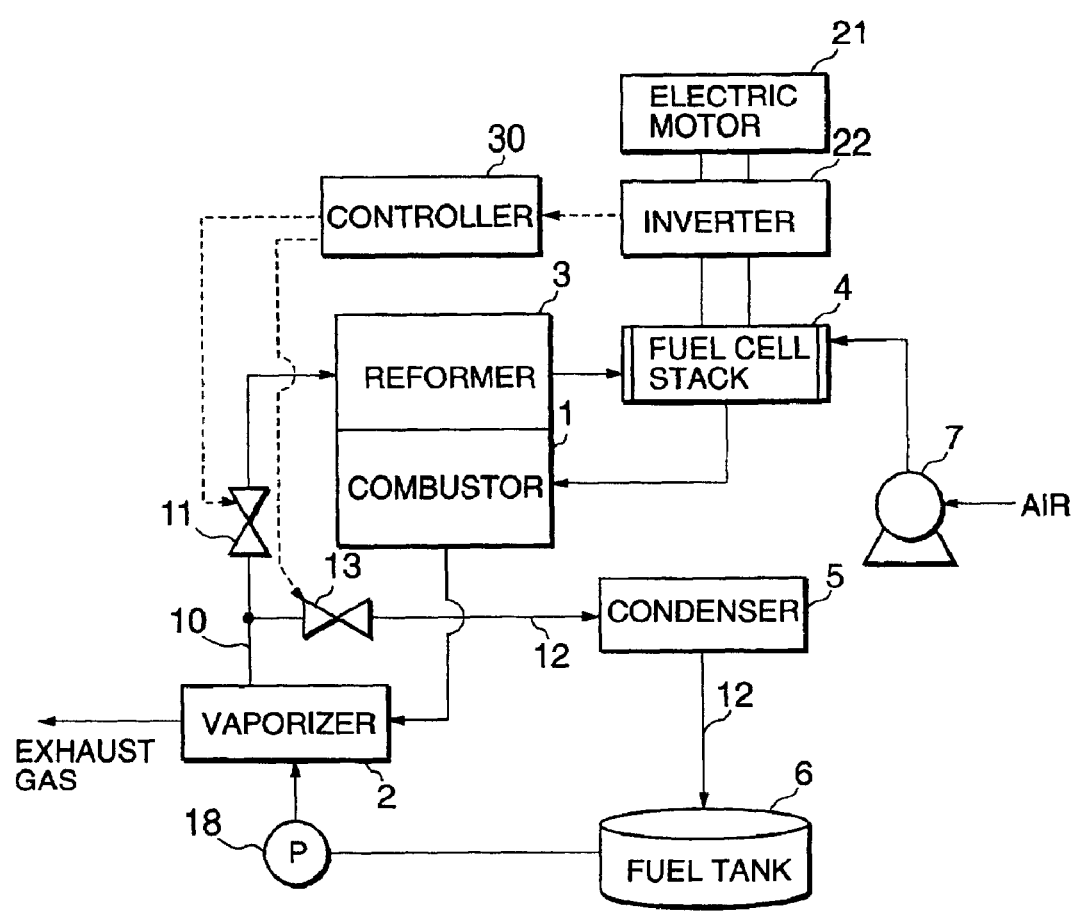
FIG. 1 is a schematic diagram of a fuel cell power plant for a vehicle according to this invention.

Referring to FIG. 1 of the drawings, a fuel cell power plant according to this invention is provided with a fuel cell stack 4. The fuel cell stack 4 comprises accumulated polymer electrolyte fuel cells (PEFC). The polymer electrolyte fuel cells generate power using a reformate gas containing hydrogen supplied from a reformer 3 and air supplied from a compressor 7.

The reformer 3 is supplied with gaseous methane from a vaporizer 2. Fuels such as gasoline containing hydrocarbons may be employed instead of methane.

The vaporizer 2 vaporizes liquid fuel supplied from a fuel tank 6 through a fuel pump 18 and supplies the gaseous fuel to the reformer 3.

A combustor 1 generates the heat required for fuel evaporation in the vaporizer 2 and heat required for reformate reactions in the reformer 3.

The combustor 1 is disposed in connection with the reformer 3 and combusts an anode effluent discharged from the fuel cell stack 4. The reformer 3 is heated by the heat of reaction. Heat required for fuel evaporation in the vaporizer 2 is supplied by discharging combustion gas through the vaporizer 2.

A first valve 11 is provided in a passage 10 from the vaporizer 2 to the reformer 3. A recovery passage 12 is connected through a second valve 13 to the passage 10 between the first valve 11 and the vaporizer 2. The recovery passage 12 is connected to a fuel tank 6 through a condenser 5.

The first valve 11 and the second valve 13 are solenoid valves which are opened and closed by signals from a controller 30.

During normal operation of the fuel cell power plant, gaseous fuel supplied from the vaporizer 2 to the reformer 3 is reformed to a reformate gas containing hydrogen in the reformer 3 and supplied to the fuel cell stack 4. After the reformate gas is used in power generation in the fuel cell stack 4, it is supplied as an anode effluent to the combustor 1. The anode effluent undergoes combustion in the combustor 1 and is discharged as a combustion gas through the vaporizer 2 to the atmosphere.

Power generated in the fuel cell stack 4 is supplied to an electric motor 21 through an inverter 22. Signals showing the current supply amount from the fuel cell stack 4 to the electric motor 21 are input from the inverter 22 to the controller 30. The controller 30 has the function of closing the first valve 11 and opening the second valve 13 when the current supply amount is less than a predetermined value. The controller 30 comprises a microcomputer or plural computers each of which is provided with a central processing unit (CPU), a read only memory (ROM), a random access memory (RAM) and an input/output interface (I/O interface). The controller 30 executes a fuel recovery routine at intervals of ten milliseconds as shown in FIG. 2.

Figure 2:
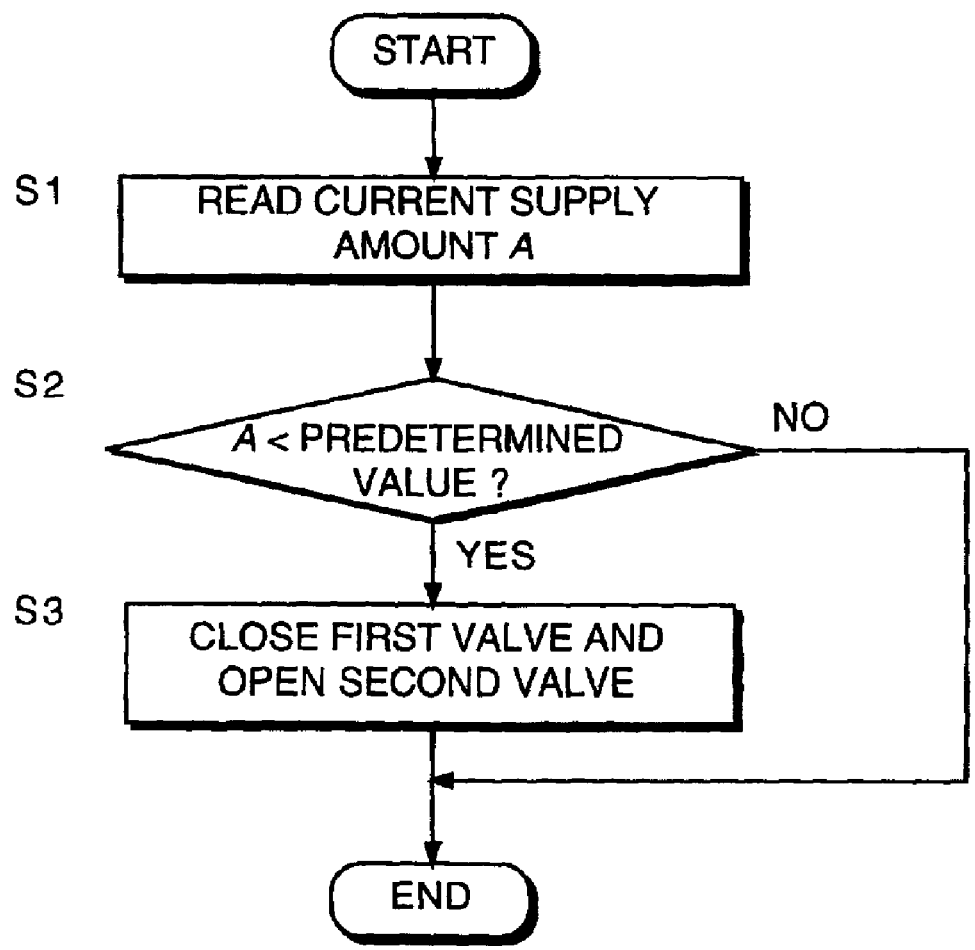
FIG. 2 is a flowchart of a fuel recovery routine executed by a controller according to this invention.

Referring to FIG. 2, in a step S1, a current supply amount A from the fuel cell stack 4 to the electric motor 21 is read based on the signal from the inverter 22. Then in a step S2, the current supply amount A is compared with a predetermined value. When the current supply amount A is not less than the predetermined value, the routine is terminated at that point. On the other hand, when the current supply amount A is less than the predetermined value, the first valve 11 is closed and the second valve 13 is opened in a step S3 and the routine is terminated.

The operation of the compressor 7 and the fuel pump 18 is also controlled by signals from the controller 30.

When the power consumption of the electric motor 21 undergoes a sharp decrease or the operation of the electric motor 21 is stopped, reformate gas reactions in the fuel cell stack 4 undergo sharp decrease or are stopped. At this time, fuel supply from the fuel tank 6 to the vaporizer 2 is stopped by the controller 30 by stopping operation of the fuel pump 18. However fuel already supplied to the vaporizer 2 is evaporated in the vaporizer 2 and is discharged in a gaseous state to the passage 10. Since the current supply amount A herein is less than the predetermined value, the first valve 11 is closed and the second valve 13 is opened due to the fuel recovery routine executed by the controller 30 as described above. As a result, when the current supply amount A from the fuel cell stack 4 to the electric motor 21 becomes less than the predetermined value, supply of gaseous fuel from the passage 10 to the reformer 3 is promptly cut off.

At this time, gaseous fuel in the vaporizer 2 and the passage 10 flows into the condenser 5 from the recovery passage 12 through the second valve 13. The condenser 5 liquefies the inflowing gaseous fuel by cooling and returns the fuel to the fuel tank 6.

When it is required that the fuel cell stack 4 resumes reactions in order to supply required power to the electric motor 21, the controller 30 resumes power generation by the fuel cell stack 4 by closing the second valve 13, opening the first valve 11 and re-supplying gaseous fuel from the vaporizer 2 to the reformer 3.

According to this fuel cell power plant, when power generation in the fuel cell stack 4 is stopped in this type of fuel cell power plant, fuel supply to the reformer 3 is immediately terminated and fuel vaporized by the vaporizer 2 is returned through the second valve 13 and the condenser 5 to the fuel tank 6. Since recovered fuel is reused in power generation, the operational efficiency of the fuel cell power plant is improved by avoiding fuel wastage. Furthermore due to the fact that fuel supply to the reformer 3 is immediately stopped, the flow of reformate gas to the vaporizer 2 through the fuel cell stack 4 is also promptly stopped. Thus the time required in order to stop heat supply to the vaporizer 2 is short which thus reduces the time required in order to stop the operation of the fuel cell power plant. Consumption of air in the combustor 1 is also reduced by quickly stopping combustion of reformate gas in the combustor 1. Thus energy consumption for operating the compressor 7 can also be reduced.

Recovery of gaseous fuel is performed with the internal pressure of the vaporizer 2 without using a pump. Thus gaseous fuel recovery does not consume energy. Furthermore since fuel flows into the fuel tank 6 after gaseous fuel in the recovery passage 12 is liquefied in the condenser 5, the pressure in the fuel tank 6 does not increase.

Figure 3:
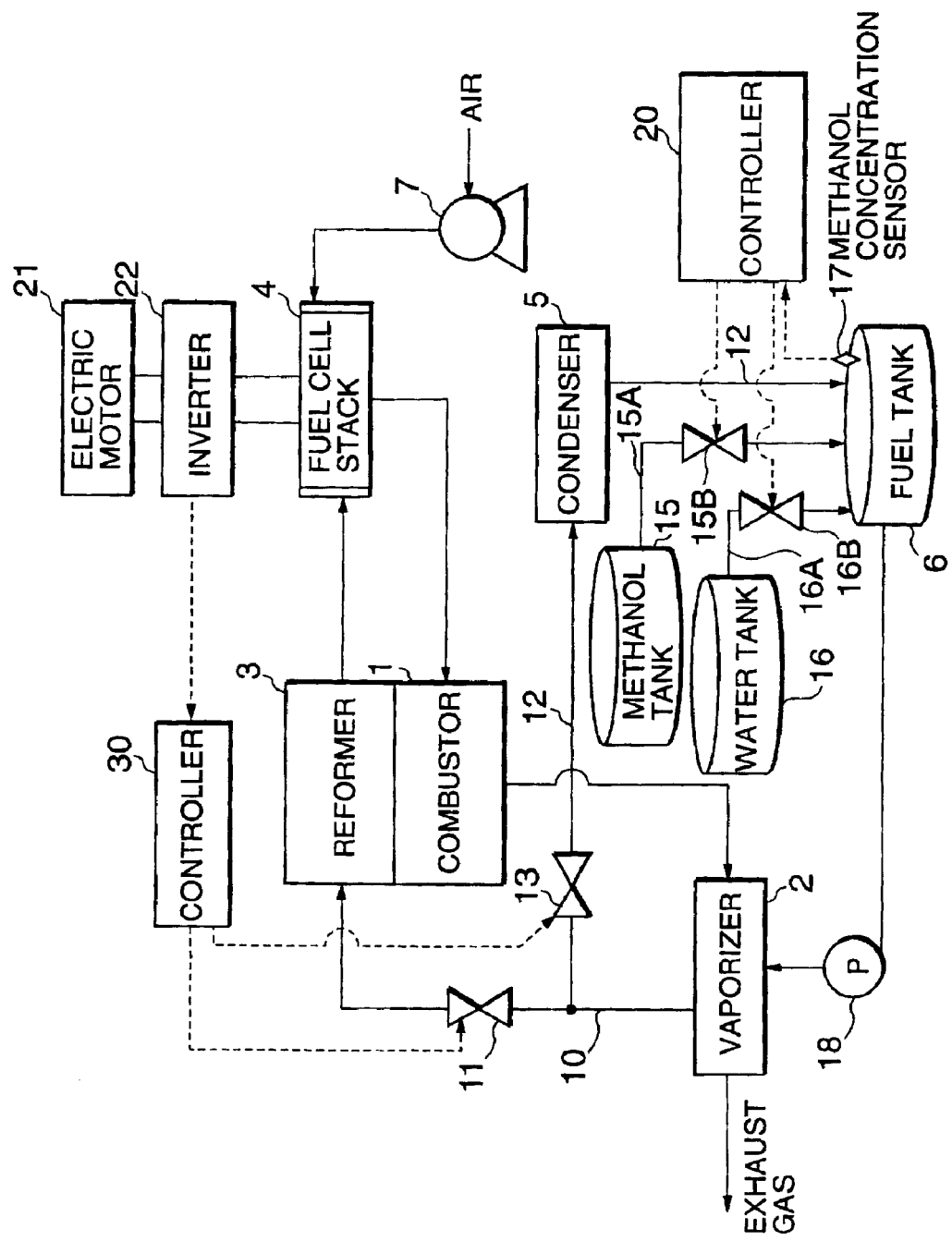
FIG. 3 is a schematic diagram of a fuel cell power plant for a vehicle according to a second embodiment of this invention.

A second embodiment of this invention will now be described with reference to FIGS. 3 and 4.

In this embodiment, a methanol tank 15 and a water tank 16 are provided on the fuel tank 6 which stores a mixture of methanol and water. The methanol tank 15 is connected to the fuel tank 6 by a supply pipe 15A and the water tank 16 is connected to the fuel tank 6 by a supply pipe 16A. The supply pipes 15A and 16A are respectively provided with a methanol valve 15B and a water valve 16B. These valves 15B, 16B comprise solenoid valves which are opened and closed in response to signals from a controller 20. The controller 20 comprises a microcomputer which has a similar construction as that of the controller 30. It is also possible to provide the controller 30 with the functions of the controller 20.

A methanol concentration sensor 17 which detects a methanol concentration is provided in the fuel tank 6. The methanol concentration detected by the methanol concentration sensor 17 is input as a signal to the controller 20.

The controller 20 operates the methanol valve 15B and the water valve 16B in order to maintain the methanol concentration in the fuel tank 6 to a fixed concentration based on the methanol concentration input to the controller 20.

Figure 4:
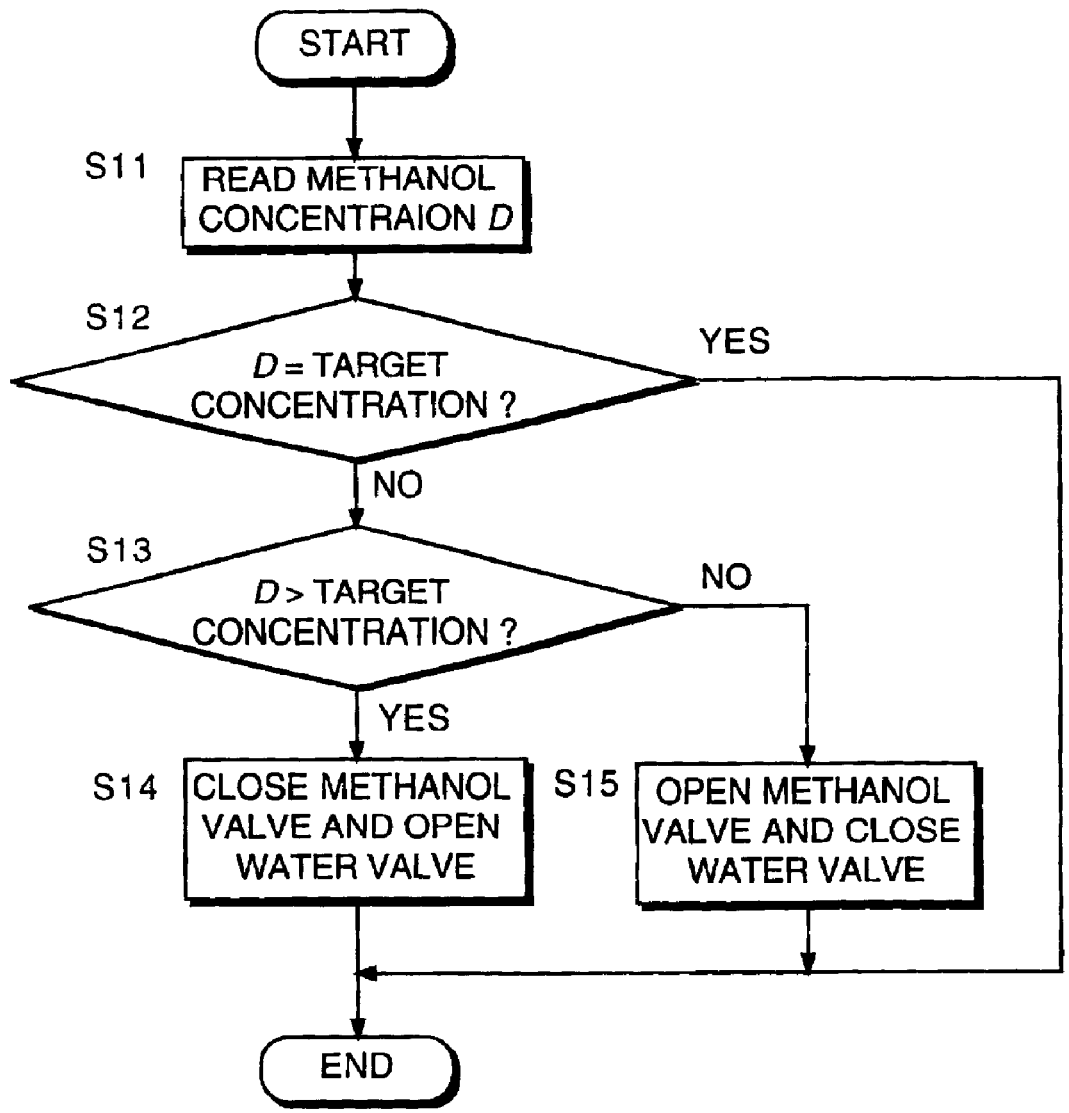
FIG. 4 is a flowchart of a fuel concentration control routine executed by a controller according to the second embodiment of this invention.

The controller 20 executes a methanol concentration control routine as shown in FIG. 4 for this purpose. This routine is executed at intervals of ten milliseconds during normal operation of the fuel cell power plant.

Firstly in a step S11, the methanol concentration D detected by the methanol concentration sensor 17 is read by the controller 20.

Then in a step S12, it is determined whether or not the methanol concentration D is equal to a preset target concentration. When the methanol concentration is equal to the target concentration, the routine is terminated at that point without proceeding to subsequent steps.

When the methanol concentration D is not equal to the target concentration, it is determined in a step S13 whether or not the methanol concentration D is higher than the target concentration. When the methanol concentration D is higher than the target concentration, the controller 20 closes the methanol valve 15B and opens the water valve 16B in a step S14, and the routine is terminated. When the methanol concentration D is not higher than the target concentration, it means that the methanol concentration D is lower than the target concentration due to the relation with the step S12. In this case, in a step S15, the controller 20 opens the methanol valve 16B and closes the water valve 16B, and the routine is terminated.

In other respects, the fuel cell power plant is identical to that of the first embodiment.

This embodiment allows the methanol concentration in the fuel tank 6 to be always maintained to the target concentration.

Figure 5:
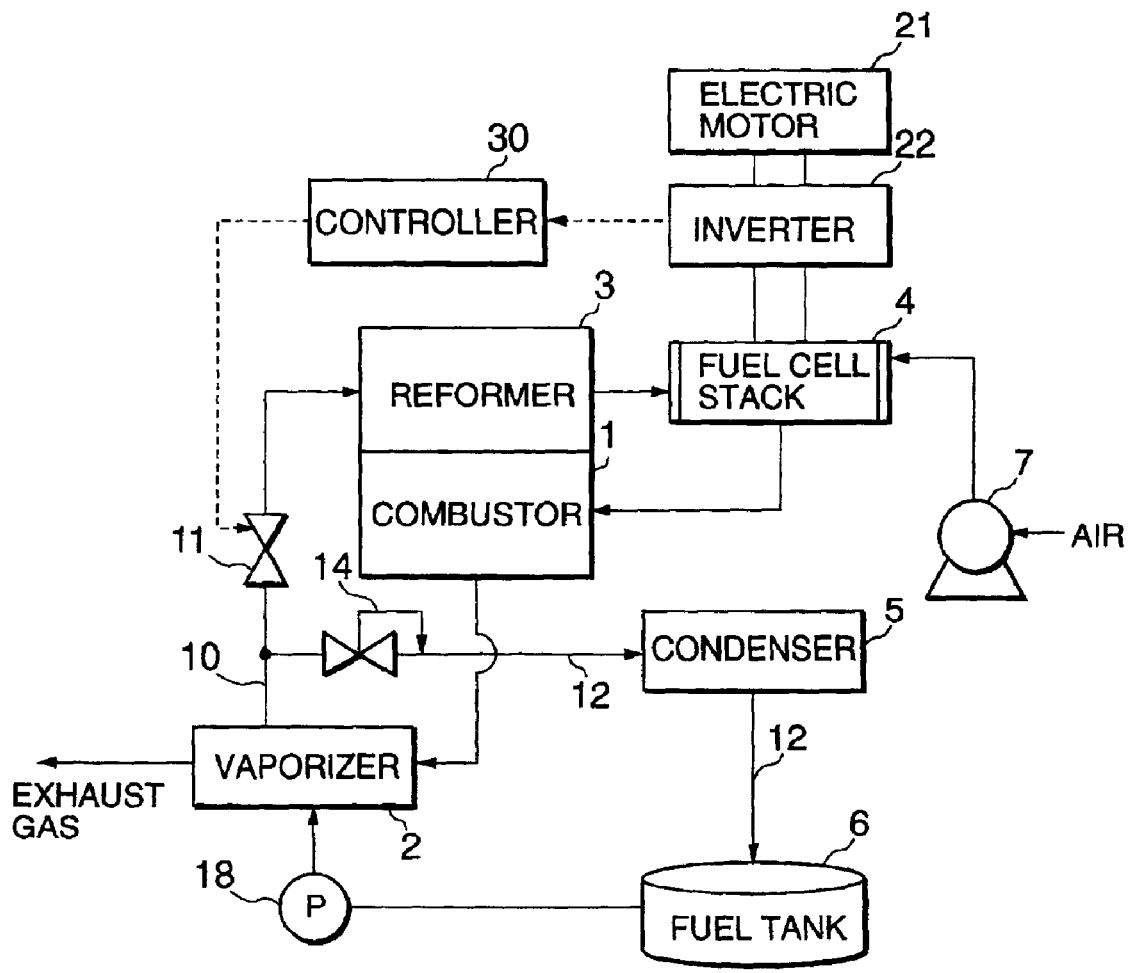
FIG. 5 is a schematic diagram of a fuel cell power plant for a vehicle according to a third embodiment of this invention.

A third embodiment of this invention will be described with reference to FIG. 5.

In this embodiment, a relief valve 14 is provided instead of the valve 13 of the first embodiment. In other respects, the fuel cell power plant is identical to that of the first embodiment.

The relief valve 14 is opened in response to a pressure increase in gaseous fuel in the passage 10 and the vaporizer 2 and allows gaseous fuel to flow into the condenser 5 via the recovery passage 12. Thus operations performed during sharp reductions in the power consumption by the electric motor 21 or when driving of the electric motor 21 is stopped can be performed by merely closing the valve 11. After closing the valve 11, the pressure of gaseous fuel in the passage 10 and the vaporizer 2 is maintained to a set pressure by the relief valve 14. Due to this pressure, when operation of the fuel cell power plant is resumed, gaseous fuel is immediately supplied to the reformer 3 when the valve 11 is opened, so start-up time can be shortened.

Figure 6:
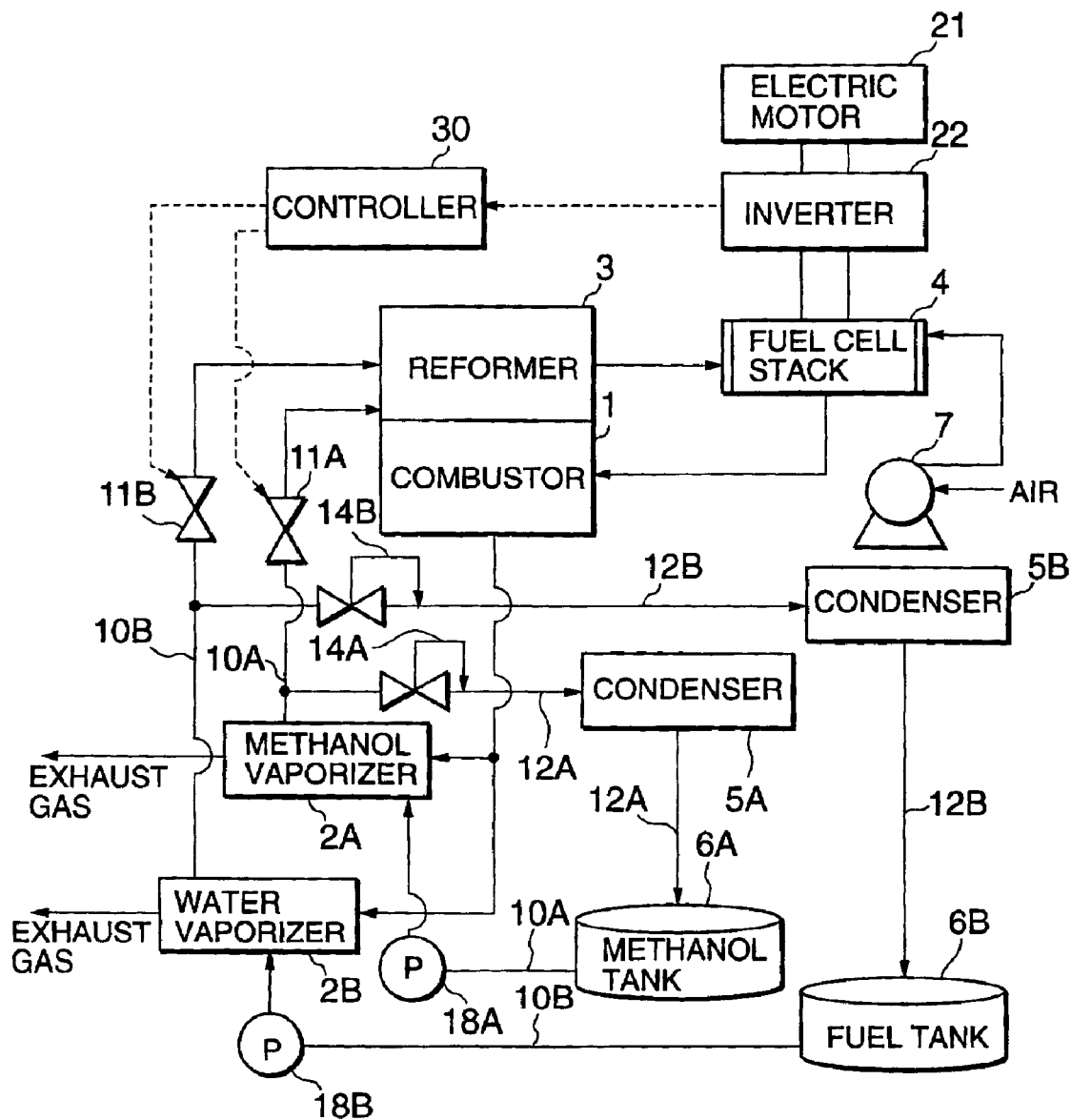
FIG. 6 is a schematic diagram of a fuel cell power plant for a vehicle according to a fourth embodiment of this invention.

A fourth embodiment of this invention will be described with reference to FIG. 6.

In this embodiment, methanol and water are separately stored in tanks 6A and 6B. The methanol tank 6A is connected to a methanol vaporizer 2A through a pump 18A. The water tank 6B is connected to a water vaporizer 2B through a pump 18B. The methanol vaporizer 2A is connected to the reformer 3 through a passage 10A and a valve 11A. The water vaporizer 2B is connected to the reformer 3 through a passage 10B and valve 11B.

A recovery passage 12A is connected through a relief valve 14A to the passage 10A between the methanol vaporizer 2A and the valve 11A. A recovery passage 12B is connected through a relief valve 14B to the passage 10B between the water vaporizer 2B and the valve 11B. The recovery passage 12A is connected to the methanol tank 6A through a condenser 5A. The recovery passage 12B is connected to the water tank 6B through a condenser 5B.

In other respects, the construction of the power plant is identical to that of the power plant of the first embodiment.

According to this embodiment, water and methanol are supplied separately to the reformer 3, and during sharp reductions in the power consumption by the electric motor 21 or when driving of the electric motor 21 is stopped, methanol and water are separately recovered.

The contents of Tokugan 2000-368460 with a filing date of Dec. 4, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A fuel cell power plant comprising:

a fuel tank storing liquid fuel;

a vaporizer vaporizing liquid fuel supplied from the fuel tank;

a reformer generating a reformate gas containing hydrogen from gaseous fuel supplied from the vaporizer;

a fuel cell stack operated by the reformate gas;

a first valve cutting off supply of gaseous fuel to the reformer from the vaporizer;

a recovery passage returning gaseous fuel in the vaporizer to the fuel tank; and a second valve cutting off the recovery passage.

2. The fuel cell power plant as defined in claim 1, wherein the fuel cell power plant further comprises a gaseous fuel supply passage connecting the vaporizer and the reformer, the first valve is provided in the gaseous fuel supply passage, and the recovery passage is connected through the second valve to the gaseous fuel supply passage between the vaporizer and the first valve.

3. The fuel cell power plant as defined in claim 1, wherein the liquid fuel contains a mixture of methanol and water, and the fuel cell power plant further comprises a methanol valve supplying methanol to the fuel tank, a water valve supplying water to the fuel tank, a sensor detecting a methanol concentration in the fuel tank and a controller functioning to open and close the methanol valve and the water valve respectively to cause the methanol concentration to coincide with a predetermined target value.

4. The fuel cell power plant as defined in claim 1, wherein the fuel cell power plant further comprises a water tank storing water, a second vaporizer vaporizing water in the water tank and supplying the vaporized water to the reformer, a third valve cutting off water vapor from the second vaporizer to the reformer, a second recovery passage returning water vapor in the second vaporizer to the water tank, and a fourth valve cutting off the second recovery passage.

5. The fuel cell power plant as defined in claim 1, wherein the second valve comprises a relief valve which opens when a pressure of gaseous fuel in the vaporizer exceeds a set pressure.

6. The fuel cell power plant as defined in claim 1, wherein the fuel cell power plant further comprises a condenser condensing gaseous fuel in the recovery passage.

7. The fuel cell power plant as defined in claim 1, wherein the fuel cell stack is connected to an electrical load, and the fuel cell power plant further comprises a sensor which detects a current supply amount from the fuel cell stack to the electrical load, and a controller functioning to close the first valve and open the second valve when the current supply amount has become lower than a predetermined amount.

* * * * *